United States Patent [19]

Hayashi

[11] Patent Number: 5,686,367
[45] Date of Patent: Nov. 11, 1997

[54] SEMICONDUCTING CERAMIC COMPOSITION HAVING POSITIVE TEMPERATURE COEFFICIENT OF RESISTANCE AND PRODUCTION PROCESS THEREOF

[75] Inventor: Kouji Hayashi, Tokyo, Japan

[73] Assignee: TDK Corporation, Tokyo, Japan

[21] Appl. No.: 598,213

[22] Filed: Feb. 7, 1996

[30] Foreign Application Priority Data

Feb. 14, 1995 [JP] Japan .................... 7-025694

[51] Int. Cl.$^6$ ........................... C04B 35/468
[52] U.S. Cl. ........................... 501/137; 501/139
[58] Field of Search ............... 501/137, 136, 501/139

[56] References Cited

U.S. PATENT DOCUMENTS

| | | |
|---|---|---|
| 4,096,098 | 6/1978 | Umeya et al. . |
| 4,956,320 | 9/1990 | Asakura et al. .............. 501/137 |
| 5,075,818 | 12/1991 | Ueno et al. .................. 501/135 |
| 5,166,759 | 11/1992 | Ueno et al. .................. 501/136 |
| 5,268,006 | 12/1993 | Ueno et al. .................. 252/520 |

FOREIGN PATENT DOCUMENTS

| | | | |
|---|---|---|---|
| 53-29386 | 8/1978 | Japan . | |
| 3-136208 | 6/1991 | Japan . | |
| 404026102 | 1/1992 | Japan | ............. 501/137 |
| 4-311002 | 11/1992 | Japan . | |

OTHER PUBLICATIONS

Chemical Abstracts, vol. 86, No. 22, May 30, 1997, "Thermistor with Positive temperature Coefficient of Resistance", Namio et al, p. 603, col. 2.

*Primary Examiner*—Karl Group
*Attorney, Agent, or Firm*—Oblon, Spivak, McClelland, Maier & Neustadt, P.C.

[57] ABSTRACT

A semiconducting ceramic composition having a positive temperature coefficient and a process for production thereof. The semiconducting ceramic composition comprises a barium titanate semiconducting ceramic composition containing silicon oxide and manganese, the semiconducting ceramic composition further comprising sodium in an amount of from 0.0005 to 0.02 wt % based on the amount of the barium titanate semiconducting ceramic composition.

20 Claims, No Drawings

5,686,367

SEMICONDUCTING CERAMIC COMPOSITION HAVING POSITIVE TEMPERATURE COEFFICIENT OF RESISTANCE AND PRODUCTION PROCESS THEREOF

FIELD OF THE INVENTION

This invention relates to barium titanate semiconducting ceramics having positive temperature coefficient of resistance and a production process thereof, more particularly to a barium titanate semiconducting ceramic composition containing silicon oxide and manganese having positive temperature coefficient of resistance and a production process thereof.

BACKGROUND OF THE INVENTION

Barium titanate semiconducting ceramic compositions are generally known as semiconductor devices having positive temperature coefficient of resistance. Since the resistance of barium titanate semiconducting ceramic compositions rapidly increases when the temperature exceeds Curie point, and the passing current is reduced thereby, they are used in various applications such as overcurrent protection of circuits, degaussing of Braun tubes of television receivers and the like. In general, in the case of the use of such semiconductor devices in electric circuits, since large variation of their resistance values at ordinary temperature causes difficulty in carrying out circuit designing and the like, it is necessary to minimize the variation of resistance value.

In addition, it is known that high voltage resistance and resistance-temperature characteristics are improved by adding silicon oxide and manganese to the aforementioned barium titanate semiconducting ceramic composition (JP-B-53-29386). Although the barium titanate semiconducting ceramic composition containing silicon oxide and manganese is excellent in electric characteristics, it requires accurate control of calcining temperature and sintering temperature for stable production of the composition having a constant level of specific resistance value at ordinary temperature. (The term "JP-B" as used herein means an examined Japanese patent publication.)

However, it is not easy to control calcining temperature and sintering temperature, and, when the specific resistance value of a calcined material is changed by the fluctuation of calcining temperature, it is necessary to adjust specific resistance value of the final semiconducting ceramic composition by controlling the sintering temperature, thus causing problems of complex sintering temperature management and poor working efficiency.

In view of the above, it therefore becomes an object of the present invention to provide a semiconducting ceramic composition having positive temperature coefficient of resistance, and a process for the production thereof, in which specific resistance value of the final semiconducting ceramic composition can be controlled without changing the sintering temperature by adjusting the amount of sodium to be added even when the specific resistance value of a calcined material is changed by the fluctuation of calcining temperature.

A semiconducting ceramic composition to which sodium is added similar to the case of the present invention is disclosed in JP-A-4-311002, but its object is to improve temperature coefficient of resistance, so that it is obviously different from the present invention in terms of the object and the addition amount of sodium. (The term "JP-A" as used herein means an unexamined published Japanese patent application.)

SUMMARY OF THE INVENTION

The present invention relates to, as a first aspect, a semiconducting ceramic composition having a positive temperature coefficient comprising a barium titanate semiconducting ceramic composition containing silicon oxide and manganese, the semiconducting ceramic composition further comprising sodium in an amount of from 0.0005 to 0.02 wt % based on the amount of the barium titanate semiconducting ceramic composition.

The present invention also relates to, as a second aspect, a process for producing a semiconducting ceramic composition having a positive temperature coefficient, the process comprising the steps of:

calcining starting materials of a barium titanate semiconducting ceramic composition containing silicon oxide and manganese;

adding a sodium compound to the calcined composition in such an amount that the sodium content is from 0.0005 to 0.02 wt % based on the amount of the barium titanate semiconducting ceramic composition; and sintering the composition.

According to the semiconducting ceramic composition of the present invention having positive temperature coefficient of resistance, a sodium compound is added in such an amount that the sodium (Na) content becomes 0.0005 to 0.02 wt % based on 100 parts of the barium titanate semiconducting ceramic composition, so that specific resistance value of the semiconducting ceramic composition can be controlled easily.

According to the process of the present invention for the production of a semiconducting ceramic composition having positive temperature coefficient of resistance, an additional step is employed in which a sodium compound is added in such an amount that the sodium (Na) content becomes 0.0005 to 0.02 wt % based on 100 parts of the barium titanate semiconducting ceramic composition, so that a semiconducting ceramic composition having a constant level of specific resistance value can be produced stably.

In other words, addition of sodium within a range of trace amounts renders possible reduction of specific resistance value of the semiconducting ceramic composition while keeping a semiconducting balance between a semiconducting agent ($Y_2O_3$, $La_2O_3$, $Nb_2O_5$ or the like) as a donor component and manganese (Mn) as an acceptor component, simultaneously preventing deterioration of breakdown voltage.

DESCRIPTION OF PREFERRED EMBODIMENTS OF THE INVENTION

The present invention will be described in detail below by referring to preferred embodiments (examples) thereof, but the present invention is not construed as being limited thereto.

EXAMPLE 1

(1) A blend of starting materials $BaCO_3$, $TiO_2$, $SrCO_3$, $Y_2O_3$, $SiO_2$ and $MnCO_3$ prepared in accordance with the following formula (1) was mixed for 15 hours using a ball mill and then dehydrated and dried.

$$(Ba_{0.796}Sr_{0.2}Y_{0.004})TiO_3 + SiO_2(0.4\%) + Mn(0.02\%) \quad (1)$$

In formula (1), the amounts of $SiO_2$ and Mn are represented by percent by weight based on the amount of the composition $(Ba_{0.796}Sr_{0.2}Y_{0.004})TiO_3$.

(2) The resulting mixture of starting materials was subjected to calcining at a calcining temperature of 1,100° C., 1,150° C. or 1,200° C. to prepare three kinds of calcined materials.

(3) Sodium hydroxide (NaOH) was added in 0 to 0.03 wt % as sodium (Na) to 100 parts of the above calcined material which had been roughly pulverized, and the resulting mixture was again mixed and pulverized for 15 hours using a ball mill and then dried while preventing leakage of sodium. The thus obtained material was mixed with 2 wt % of an acrylic organic binder, and the mixture was granulated and then molded into a disc-like shape of 14 mm in diameter and 3 mm in thickness under a molding pressure of 2 t/cm².

While an acrylic organic binder is used in this example as an organic binder, the binder is not particularly limited in the present invention, and the same effect can be obtained by the use of polyvinyl alcohol as a binder.

(4) The disc-like moldings obtained above were subjected to 2 hours of sintering at 1,350° C. to prepare 24 kinds of semiconducting ceramic compositions having different calcining temperatures and sodium contents.

(5) After making ohmic electrodes on both main surfaces of each of the thus prepared semiconducting ceramic compositions by electroless plating of nickel (Ni), an electrode was formed by applying and printing silver paste on the surface of the ohmic electrode.

A total of 24 samples of the thus obtained semiconducting ceramic compositions were measured for their specific resistance values and breakdown voltage values at 25° C., with the results shown in Table 1.

TABLE 1

| Sample No. | Calcining temperature (°C.) | Na added (wt %) | Specific resistance (Ω · cm) | Breakdown voltage (V_dc) |
|---|---|---|---|---|
| 1 | 1,100 | not added | 90 | 801 |
| 2 | 1,100 | 0.0002 | 90 | 810 |
| 3 | 1,100 | 0.0005 | 80 | 800 |
| 4 | 1,100 | 0.001 | 75 | 750 |
| 5 | 1,100 | 0.005 | 45 | 648 |
| 6 | 1,100 | 0.01 | 25 | 525 |
| 7 | 1,100 | 0.02 | 30 | 510 |
| 8 | 1,100 | 0.03 | 60 | 402 |
| 9 | 1,150 | not added | 170 | 969 |
| 10 | 1,150 | 0.0002 | 170 | 969 |
| 11 | 1,150 | 0.0005 | 150 | 945 |
| 12 | 1,150 | 0.001 | 120 | 900 |
| 13 | 1,150 | 0.005 | 80 | 800 |
| 14 | 1,150 | 0.01 | 52 | 520 |
| 15 | 1,150 | 0.02 | 60 | 702 |
| 16 | 1,150 | 0.03 | 100 | 490 |
| 17 | 1,200 | not added | 360 | 1,188 |
| 18 | 1,200 | 0.0002 | 360 | 1,224 |
| 19 | 1,200 | 0.0005 | 320 | 1,216 |
| 20 | 1,200 | 0.001 | 300 | 1,170 |
| 21 | 1,200 | 0.005 | 160 | 940 |
| 22 | 1,200 | 0.01 | 80 | 800 |
| 23 | 1,200 | 0.02 | 85 | 799 |
| 24 | 1,200 | 0.03 | 170 | 493 |

As shown in Table 1, when 0.0005 wt % or more of sodium is added, specific resistance value of the semiconducting ceramic composition becomes low as the amount of added sodium increases, and variation of the specific resistance value at each calcining temperature (1,100° C., 1,150° C., 1,200° C.) becomes small. In addition, breakdown voltage tends to decrease as the amount of added sodium increases.

In consequence, a semiconducting ceramic composition having small variation of specific resistance value can be produced stably without changing the sintering temperature, by carrying out the sintering without adding sodium or by adding it in a small amount when the calcining temperature is low, or by adding sodium in an increased amount when the calcining temperature is high.

For example, when the preliminary baking temperature was 1,100° C. and sodium was not added (sample No. 1), specific resistance value after the sintering was 90 Ω·cm which was almost the same as the specific resistance value of 85 Ω·cm after the sintering when the calcining was carried out at 1,200° C. and 0.02 wt % of sodium was added (sample No. 23).

When the aforementioned semiconducting ceramic composition is used in electric circuits as semiconductor devices for heating, current limiting and the like use, a breakdown voltage of 500 $V_{dc}$ or more is generally required. When sodium is added in an amount of 0.03 wt % or more, the crystal structure after sintering is deteriorated and the breakdown voltage is lowered. Thus, such a demand of breakdown voltage cannot be satisfied.

In consequence, it is desirable to add a sodium compound in an amount of from 0.0005 to 0.02 wt % as sodium. If the amount of sodium is less than 0.0005 wt %, sufficient effect of controlling the specific resistance cannot be obtained.

EXAMPLE 2

A total of 21 kinds semiconducting ceramic compositions were prepared by repeating the same manner of Example 1, except for the use of a blend of starting materials $BaCO_3$, $TiO_2$, PbO, $Y_2O_3$, $SiO_2$ and $MnCO_3$ prepared in accordance with the following formula (2).

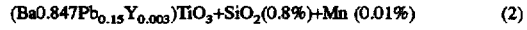
$(Ba_{0.847}Pb_{0.15}Y_{0.003})TiO_3+SiO_2(0.8\%)+Mn\ (0.01\%)$ (2)

In formula (2), the amounts of $SiO_2$ and Mn are represented by percent by weight based on the amount of the composition $(Ba_{0.847}Pb_{0.15}Y_{0.003})TiO_3$.

A total of 21 samples of the thus obtained semiconducting ceramic compositions were measured for their specific resistance values and breakdown voltage values at 25° C., with the results shown in Table 2.

TABLE 2

| Sample No. | Calcining temperature (°C.) | Na added (wt %) | Specific resistance (Ω · cm) | Breakdown voltage (V_dc) |
|---|---|---|---|---|
| 1 | 1,050 | not added | 120 | 504 |
| 2 | 1,050 | 0.0003 | 120 | 504 |
| 3 | 1,050 | 0.0005 | 110 | 528 |
| 4 | 1,050 | 0.001 | 100 | 541 |
| 5 | 1,050 | 0.01 | 70 | 518 |
| 6 | 1,050 | 0.02 | 80 | 512 |
| 7 | 1,050 | 0.03 | 300 | 480 |
| 8 | 1,100 | not added | 250 | 600 |
| 9 | 1,100 | 0.0003 | 250 | 625 |
| 10 | 1,100 | 0.0005 | 230 | 598 |
| 11 | 1,100 | 0.001 | 220 | 594 |
| 12 | 1,100 | 0.01 | 95 | 560 |
| 13 | 1,100 | 0.02 | 110 | 550 |
| 14 | 1,100 | 0.03 | 400 | 490 |
| 15 | 1,150 | not added | 400 | 800 |
| 16 | 1,150 | 0.0003 | 400 | 800 |
| 17 | 1,150 | 0.0005 | 360 | 864 |
| 18 | 1,150 | 0.001 | 320 | 800 |
| 19 | 1,150 | 0.01 | 120 | 576 |
| 20 | 1,150 | 0.02 | 130 | 530 |
| 21 | 1,150 | 0.03 | 500 | 475 |

Similar to the case of Example 1, the results of Table 2 show that, when 0.0005 to 0.02 wt % of sodium is added, specific resistance value of the semiconducting ceramic composition becomes low as the amount of added sodium increases, and variation of the specific resistance value at each calcining temperature (1,050° C., 1,100° C., 1,150° C.) becomes small. In addition, breakdown voltage also tends to decrease as the amount of added sodium increases, similar to the case of Example 1.

In consequence, similar effects of Example 1 can be obtained when a sodium compound is added in an amount of from 0.0005 to 0.02 wt % as sodium.

In the present invention, the amount of sodium is from 0.0005 to 0.02 wt % based on the amount of the barium titanate semiconducting ceramic composition. The amount of sodium is preferably from 0.001 to 0.02 wt %, and more preferably from 0.001 to 0.008 wt %.

While sodium hydroxide is used as the sodium compound in Examples 1 and 2, the sodium compound used in the present invention is not particularly limited, and the same effects can be obtained when other sodium compounds such as sodium carbonate and the like are used. In an industrial scale production, sodium carbonate is preferred from the standpoint of its handling.

With regard to the materials of the barium titanate semiconducting ceramic composition, various barium titanate materials may be used such as those in which a portion of Ba is substituted by Sr, Pb, Ca and the like, in which Y, La and the like rare earth elements or other elements such as Nb, Sb and the like are contained as semiconducting materials and in which $SiO_2$, $Al_2O_3$, $K_2O$, ZnO, $P_2O_5$, Fe and the like are added as additives. In general, the Ti content is from 0.995 to 1.03 mol, the Pb content is from 0 to 0.6 mol, the Ca content is from 0 to 0.4 mol, the Ba content is from 0.4 to 0.999 mol, the Sr content is from 0 to 0.6 mol, and the Y content is from 0.001 to 0.008 mol. The barium titanate composition generally contains silicon oxide in an amount of from 0.2 to 1.0 wt %, and manganese in an amount of from 0.002 to 0.04 wt %.

In the process for producing a semiconducting ceramic composition having a positive temperature coefficient according to the present invention, the starting materials for the ceramic composition, the calcining temperature, and the sintering temperature are not particularly limited. In general, the calcining temperature is from 1,050° to 1,250° C., and the sintering temperature is from 1,250° to 1,400° C., while they depend on the type of composition.

Since the present invention has the aforementioned constitution, a semiconducting ceramic composition having a constant level of specific resistance value can be produced stably.

The present invention exerts the following effects:

(1) Changes in the specific resistance value of the calcined material caused by variation of the calcining temperature can be corrected without changing the sintering temperature, by adjusting amount of a sodium compound to be added.

(2) Variation of the specific resistance value of the final semiconducting ceramic composition due to variation of the calcining temperature can be prevented by the addition of a sodium compound.

While the invention has been described in detail and with reference to specific examples thereof, it will be apparent to one skilled in the art that various changes and modifications can be made therein without departing from the spirit and scope thereof.

What is claimed is:

1. A semiconducting ceramic composition having a positive temperature coefficient, comprising barium, oxygen, titanium, silicon, manganese and a semiconducting material element, having a molar ratio of Ba:O of 0.4:3 to 0.999:3, Ti:O of 0.995:3 to 1.03:3, an amount of silicon, as silicon oxide, of 0.2 to 1.0 wt.%, an amount of manganese of 0.002 to 0.04 wt.%, and an amount of sodium of 0.0005 to 0.02 wt.%.

2. A semiconducting ceramic composition as claimed in claim 1, comprising sodium in an amount of from 0.001 to 0.02 wt %.

3. A semiconducting ceramic composition as claimed in claim 2, comprising sodium in an amount of from 0.001 to 0.008 wt %.

4. The semiconducting ceramic composition of claim 1, further comprising calcium in a molar ratio of Ca:O of 0:3 to 0.4:3.

5. The semiconducting ceramic composition of claim 1, further comprising strontium in a molar ratio Sr:O of 0:3 to 0.6:3.

6. The semiconducting ceramic composition of claim 1, further comprising lead in a molar ratio of Pb:O of 0:3 to 0.6:3.

7. The semiconducting ceramic composition of claim 1, wherein said semiconducting material element is selected from the group consisting of Y, rare earth elements, Nb and Sb.

8. The semiconducting ceramic composition of claim 1, wherein said semiconducting materials element is yttrium present in a molar ratio of Y:O of 0.001:3 to 0.008:3.

9. A process for producing a semiconducting ceramic composition having a positive temperature coefficient, comprising:

calcining starting materials to produce a composition comprising barium, oxygen, titanium, silicon, manganese and a semiconducting material element, having a molar ratio of Ba:O of 0.4:3 to 0.999:3, Ti:O of 0.995:3 to 1.03:3, an mount of silicon, as silicon oxide, of 0.2 to 1.0 wt.%, and an amount of manganese of 0.002 to 0.04 wt.%;

adding a sodium compound to said composition in such an amount that the sodium content is from 0.0005 to 0.02 wt.%; and sintering said composition.

10. A process for producing a semiconducting ceramic composition as claimed in claim 9, wherein said sodium compound is added in such an amount that the sodium content is from 0.001 to 0.02 wt %.

11. A process for producing a semiconducting ceramic composition as claimed in claim 10, wherein said sodium compound is added in such an amount that the sodium content is from 0.001 to 0.008 wt %.

12. The process of claim 9, wherein said composition further comprises calcium in a molar ratio of Ca:O of 0:3 to 0.4:3.

13. The process of claim 9, wherein said composition further comprises strontium in a molar ratio Sr:O of 0:3 to 0.6:3.

14. The process of claim 9, wherein said composition further comprises lead in a molar ratio of Pb:O of 0:3 to 0.6:3.

15. The process of claim 9, wherein said semiconducting material element is selected from the group consisting of Y, rare earth elements, Nb and Sb.

16. The process of claim 9, wherein said semiconducting materials element is yttrium present in a molar ratio of Y:O of 0.001:3 to 0.008:3.

17. The process of claim 9, wherein said calcining is carried out at temperature of 1050° to 1250° C.

18. The process of claim 9, wherein said sintering is carried out at a temperature of 1250° to 1400° C.

19. A product produced by the process of claim 9.

20. A product produced by the process of claim 11.

* * * * *